US008104261B2

(12) United States Patent
Marshall et al.

(10) Patent No.: US 8,104,261 B2
(45) Date of Patent: Jan. 31, 2012

(54) TRI-BODY VARIABLE AREA FAN NOZZLE AND THRUST REVERSER

(75) Inventors: Richard M. Marshall, West Granby, CT (US); Robert L. Gukeisen, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 405 days.

(21) Appl. No.: 12/307,598

(22) PCT Filed: Oct. 12, 2006

(86) PCT No.: PCT/US2006/039806
§ 371 (c)(1),
(2), (4) Date: Jan. 6, 2009

(87) PCT Pub. No.: WO2008/045056
PCT Pub. Date: Apr. 17, 2008

(65) Prior Publication Data
US 2009/0288386 A1 Nov. 26, 2009

(51) Int. Cl.
*F02K 3/02* (2006.01)
(52) U.S. Cl. .......... 60/226.2; 60/226.1; 60/262; 60/771; 239/265.31; 239/265.19; 239/265.33
(58) Field of Classification Search .................. 60/226.1, 60/262, 771, 226.2; 239/265.19, 265.33, 239/265.31
See application file for complete search history.

(56) References Cited

U.S. PATENT DOCUMENTS

| 2,950,595 A | 8/1960 | Laucher et al. |
| 3,820,719 A | 6/1974 | Clark |
| 3,829,020 A | 8/1974 | Stearns |
| 4,741,246 A | 5/1988 | Padarev |
| 4,922,713 A | 5/1990 | Barbarin et al. |

FOREIGN PATENT DOCUMENTS

EP 0779429 A2 6/1997

OTHER PUBLICATIONS

Search Report and Written Opinion mailed on Jul. 11, 2007 for PCT/US2006/039806.
International Preliminary Report on Patentability dated Dec. 22, 2008.

*Primary Examiner* — Ehud Gartenberg
*Assistant Examiner* — Craig Kim
(74) *Attorney, Agent, or Firm* — Carlson Gaskey & Olds, P.C.

(57) ABSTRACT

A gas turbine engine system includes a fan (14), a housing (28) arranged about the fan, a gas turbine engine core having a compressor (16) at least partially within the housing, and a fan bypass passage (30) downstream of the fan for conveying a bypass airflow (D) between the housing and the gas turbine engine core. A nozzle (40) associated with the fan bypass passage includes a first nozzle section (54*a*) that is operative to move in a generally axial direction to influence the bypass airflow, and a second nozzle section that is operative to also move in a generally axial direction between a stowed position and a thrust reverse position that diverts the bypass airflow in a thrust reversing direction. An actuator (42) selectively moves the first nozzle section and the second nozzle section to influence the bypass airflow and provide thrust reversal.

18 Claims, 3 Drawing Sheets

TRI-BODY VARIABLE AREA FAN NOZZLE AND THRUST REVERSER

BACKGROUND OF THE INVENTION

This invention relates to gas turbine engines and, more particularly, to a gas turbine engine having a nozzle that integrates functions of a variable fan nozzle and a thrust reverser.

Gas turbine engines are widely known and used for power generation and vehicle (e.g., aircraft) propulsion. A typical gas turbine engine includes a compression section, a combustion section, and a turbine section that utilize a primary airflow into the engine to generate power or propel the vehicle. The gas turbine engine is typically mounted within a housing, such as a nacelle. A bypass airflow flows through a passage between the housing and the engine and exits from the engine at an outlet.

Presently, conventional thrust reversers are used to generate a reverse thrust force to slow forward movement of a vehicle, such as an aircraft. One type of conventional thrust reverser utilizes a moveable door stowed near the rear of the nacelle. After touch-down of the aircraft for landing, the door moves into the bypass airflow passage to deflect the bypass airflow radially outwards into cascades, or vents, that direct the discharge airflow in a forward direction to slow the aircraft. Although effective, this and other conventional thrust reversers serve only for thrust reversal and, when in the stowed position for non-landing conditions, do not provide additional functionality. The use of a variable area fan nozzle (VAFN) has been proposed for low pressure ratio fan designs to improve the propulsive efficiency of high bypass ratio gas turbine engines. Therefore, the problem to be solved is integrating the VAFN functionality with the thrust reverser to reduce complexity and weight.

SUMMARY OF THE INVENTION

A gas turbine engine system includes a fan, a housing arranged about the fan, a gas turbine engine core having a compressor within the housing, and a fan bypass passage downstream of the fan for conveying a bypass airflow between the housing and the gas turbine engine core. A nozzle associated with the fan bypass passage includes a first nozzle section that is operative to move in a generally axial direction to influence the bypass airflow, and a second nozzle section that is operative to also move in a generally axial direction between a stowed position and a thrust reverse position that diverts the bypass airflow in a thrust reversing direction. An actuator selectively moves the first nozzle section and the second nozzle section to influence the bypass airflow and provide thrust reversal.

An example method of controlling the gas turbine engine system includes the steps of selectively moving the first nozzle section between an open position and a closed position to vary an effective cross-sectional area of the nozzle to control the bypass airflow and selectively moving the second nozzle section between a stowed position and a thrust reverse position to reverse a direction of the bypass flow and produce a thrust reversal force.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
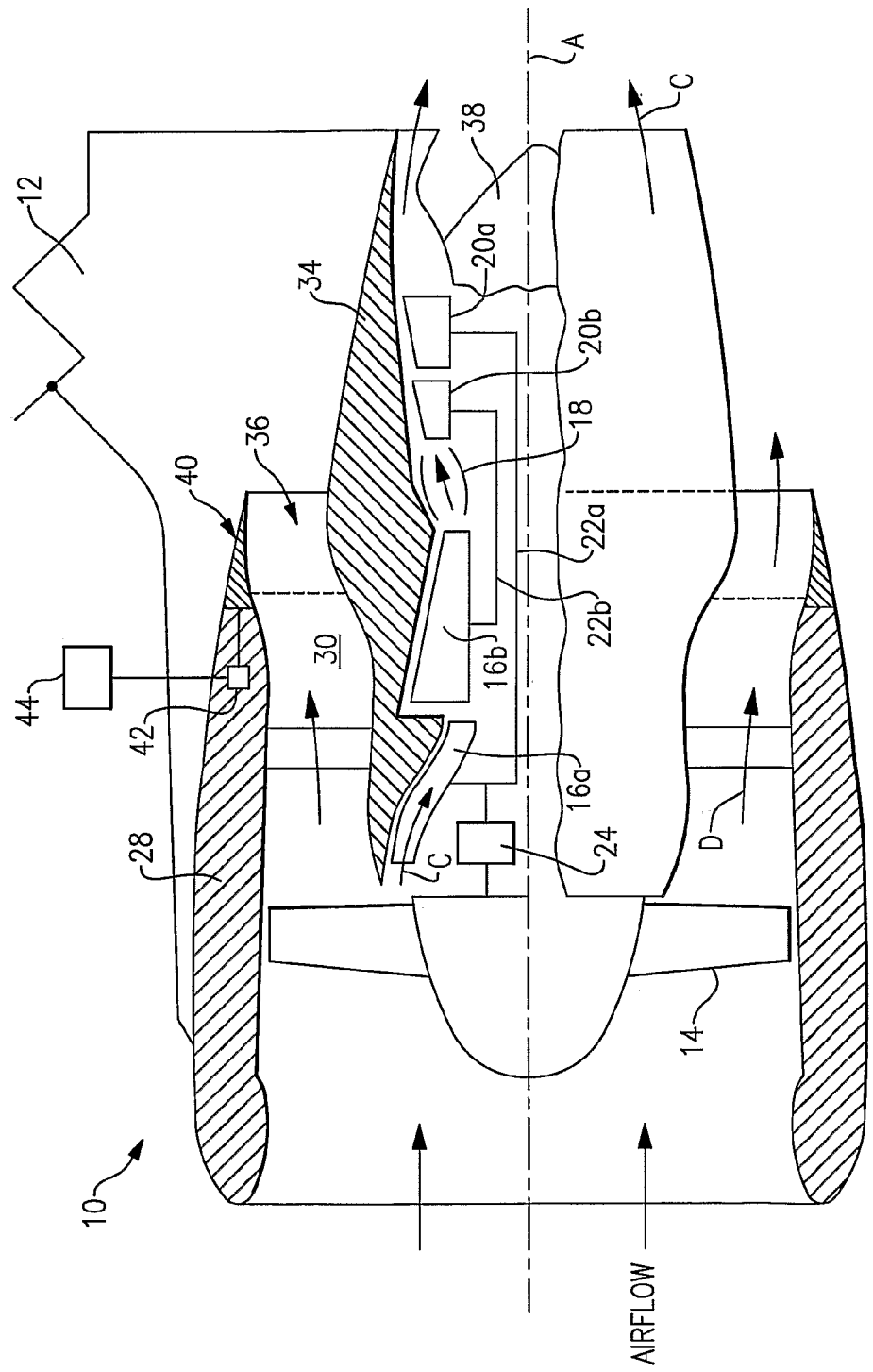
FIG. 1 illustrates selected portions of an example gas turbine engine system having a nozzle for varying an effective exit area or producing a thrust reversing force.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a low pressure turbine 20a, and a high pressure turbine 20b. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22a and 22b (e.g., spools) to rotationally drive the compressors 16a, 16b and the fan 14 in response to the expansion. In this example, the rotor 22a also drives the fan 14 through a gear train 24.

In the example shown, the gas turbine engine 10 is a high bypass turbofan arrangement. In one example, the bypass ratio is greater than 10:1, and the fan 14 diameter is substantially larger than the diameter of the low pressure compressor 16a. The low pressure turbine 20a has a pressure ratio that is greater than 5:1, in one example. The gear train 24 can be any known suitable gear system, such as a planetary gear system with orbiting planet gears, planetary system with non-orbiting planet gears, or other type of gear system. In the disclosed example, the gear train 24 has a constant gear ratio. Given this description, one of ordinary skill in the art will recognize that the above parameters are only exemplary and that other parameters may be used to meet the particular needs of an implementation.

An outer housing, nacelle 28, (also commonly referred to as a fan nacelle or fan cowl) extends circumferentially about the fan 14. A generally annular fan bypass passage 30 extends between the nacelle 28 and an inner housing, inner cowl 34, which generally surrounds the compressors 16a, 16b and turbines 20a, 20b.

In operation, the fan 14 draws air into the gas turbine engine 10 as a core flow, C, and into the bypass passage 30 as a bypass airflow, D. In one example, approximately 80 percent of the airflow entering the nacelle 28 becomes bypass airflow D. A rear exhaust 36 discharges the bypass airflow D from the gas turbine engine 10. The core flow C is discharged from a passage between the inner cowl 34 and a tail cone 38. A significant amount of thrust may be provided by the discharge flow due to the high bypass ratio.

The example gas turbine engine 10 shown FIG. 1 also includes a nozzle 40 (shown schematically) associated with the bypass passage 30. In this example, the nozzle 40 is shown near the rear of the nacelle 28, however, in other examples, the nozzle 40 is not an exhaust nozzle but is rather located farther forward but aft of the fan 14. In this example, the nozzle 40 is coupled to the nacelle 28.

The nozzle 40 is operatively connected with actuators 42 for movement between a plurality of positions to influence the bypass airflow D, such as to manipulate an air pressure of the bypass airflow D. A controller 44 commands the actuators 42 to selectively move the nozzle 40 among the plurality of positions to manipulate the bypass airflow D in a desired manner. The controller 44 may be dedicated to controlling the actuators 42 and nozzle 40, integrated into an existing engine controller within the gas turbine engine 10, or be incorporated with other known aircraft or engine controls. For example, selective movement of the nozzle 40 permits the controller 44 to vary the amount and direction of thrust provided, enhance conditions for aircraft control, enhance conditions for operation of the fan 14, or enhance conditions for operation of other components associated with the bypass passage 30, depending on input parameters into the controller 44.

In one example, the gas turbine engine 10 is designed to operate within a desired performance envelope under certain predetermined conditions, such as cruise. For example, the fan 14 is designed for a particular flight condition—typically cruise at 0.8 Mach and 35,000 feet. The fan 14 is designed at a particular fixed stagger angle for an efficient cruise condition. The nozzle 40 is operated to influence the bypass airflow D such that the angle of attack or incidence on the fan 14 is maintained close to design incidence at other flight conditions, such as landing and takeoff, thus enabling a desired engine operation over a range of flight condition with respect to performance and other operational parameters such as noise levels. In one example, it is desirable to operate the fan 14 under a desired pressure ratio range (i.e., the ratio of air pressure forward of the fan 14 to air pressure aft of the fan 14) to avoid fan flutter. To maintain this range, the nozzle 40 is used to influence the bypass airflow D to control the air pressure aft of the fan 14 and thereby control the pressure ratio. In some examples, the nozzle varies an effective cross-sectional area associated with the rear exhaust 36 of the bypass passage 30 by approximately 20% to influence the bypass airflow D.

Figure 2:
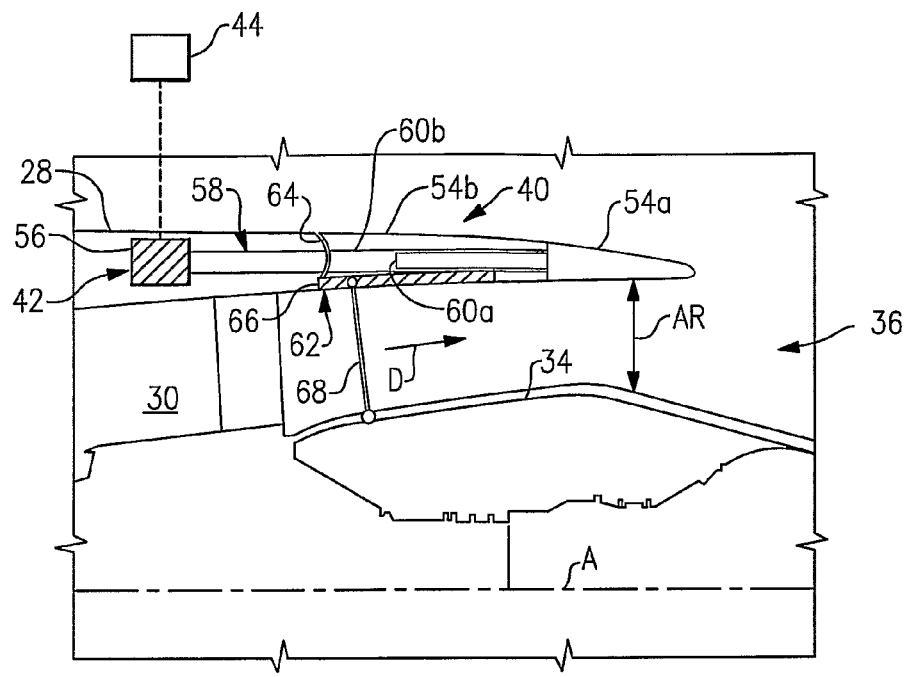
FIG. 2 illustrates a schematic view of the nozzle in a closed/stowed position.

FIG. 2 illustrates an example of the nozzle 40 for varying the effective cross-sectional area and functioning as a thrust reverser to slow movement of a vehicle such as an aircraft, as will be described below. In this example, the nozzle 40 includes a first nozzle section 54a and a second nozzle section 54b that is located forwardly adjacent the first nozzle section 54a. The first nozzle section 54a is moveable between a plurality of positions in a generally axial direction relative to the centerline axis A, and the second nozzle section 54b is moveable between a stowed position and a thrust reverse position that diverts the bypass airflow D in a thrust reversing direction.

In this example, each actuator 42 includes a control section 56 that communicates with the controller 44, and a telescoping member 58 for selectively moving the first nozzle section 54a and the second nozzle section 54b. In this example, the telescoping member 58 includes a first telescoping section 60a, such as a cylindrical shaft, connected with the first nozzle section 54a. A second telescoping section 60b, such as another cylindrical shaft, is concentrically arranged about the first telescoping section 60a and connected with the second nozzle section 54b. Given this description, one of ordinary skill in the art will recognize other types of actuator arrangements suitable for moving the first nozzle section 54a and the second nozzle section 54b.

Figure 4:
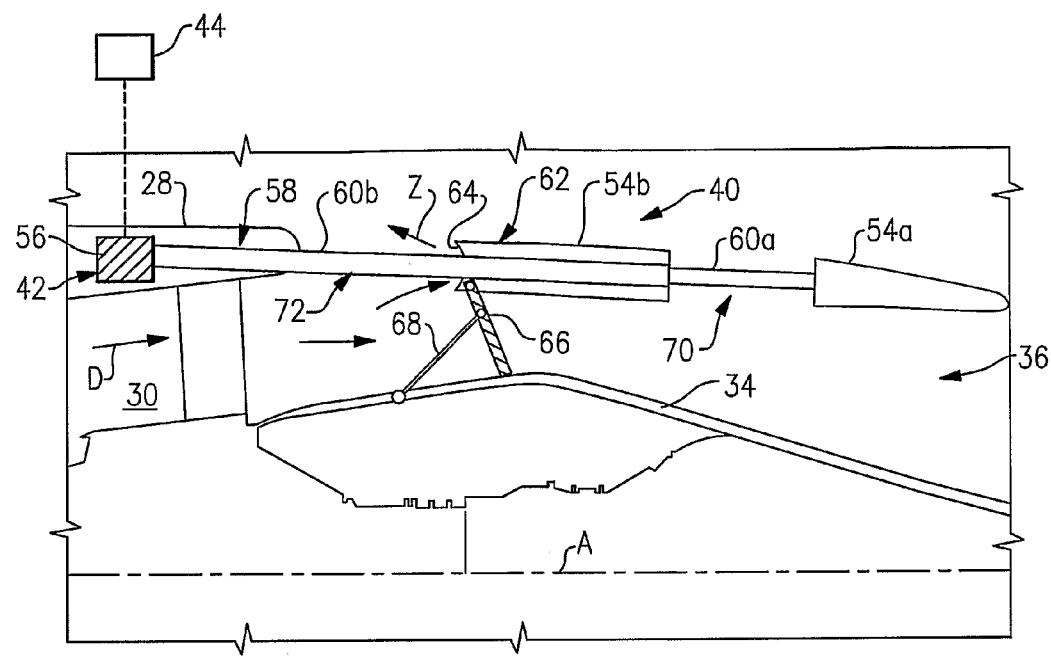
FIG. 4 illustrates a schematic view of the nozzle in a thrust reverse position.

The second nozzle section 54b includes a leading end 62 having a curved surface 64 that seals against the nacelle 28 in this example. A radially inner portion of the second nozzle section 54b stows blocker doors 66 (one shown) that are pivotally attached to the second nozzle section 54b in a known manner. A drag link 68 is pivotally attached at one end to the blocker door 66 and pivotally attached at its other end to the inner cowl 34 in this example. Optionally, the drag links 68 are slidably connected to the blocker doors 66, inner cowl 34, or both to facilitate movement of the blocker doors 66 between the stowed position and the deployed, thrust reverse position (FIG. 4).

In operation, the controller 44 selectively commands the actuators 42 to move the first nozzle section 54a to influence the bypass airflow D or to move the second nozzle section 54b to provide thrust reversal. The actuators 42 can independently move the first nozzle section 54a and the second nozzle section 54b. FIG. 2 illustrates the first nozzle section 54a in a closed position and the second nozzle section 54b in the stowed position sealed against the nacelle 28. In the closed/stowed position, the bypass airflow D exits axially through the rear exhaust 36, and the nozzle 40 has an effective cross-sectional area that corresponds to a distance AR between the nozzle 40 and the inner cowl 34 in this example.

Figure 3:
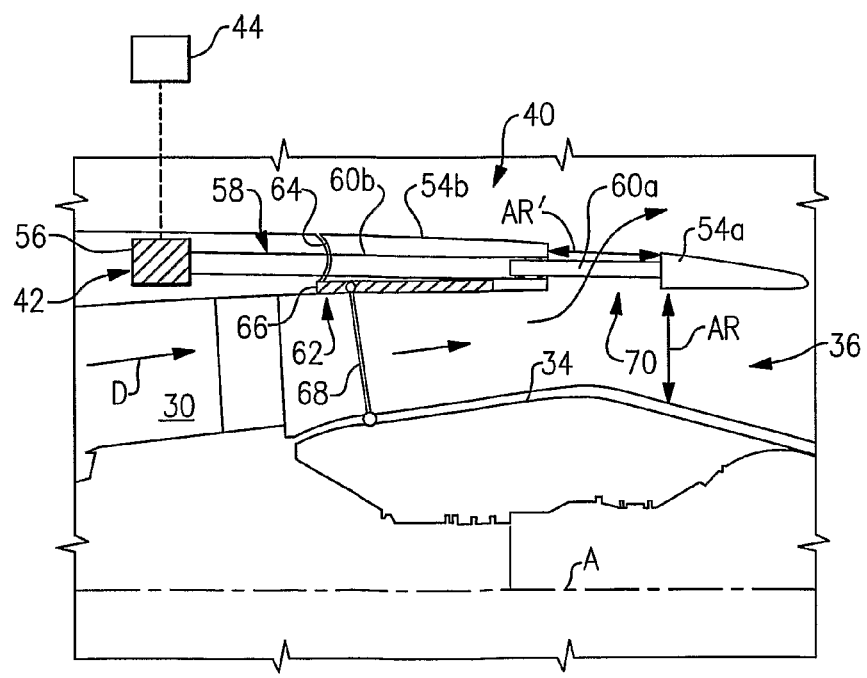
FIG. 3 illustrates a schematic view of the nozzle in an open position for increasing the effective exit area.

Referring to FIG. 3, the actuators 42 extend the first telescoping section 60a from the second telescoping section 60b in response to a command from the controller 44 to move the nozzle from the closed position to the open position. In the open position, the first nozzle section 54a is spaced apart from the second nozzle section 54b to provide an opening 70 there between. In one example, the first telescoping section 60a is moved in a known manner using hydraulic or pneumatic power.

The opening 70 provides an auxiliary passage having a cross-sectional area proportional to a distance AR' between the first nozzle section 54a and the second nozzle section 54b for the discharge of the bypass airflow D. The auxiliary passage provides an additional passage (i.e., additional effective cross-sectional flow area) for exit of the bypass airflow D from the bypass passage 30 to thereby alter the bypass airflow D. Thus, the total effective cross-sectional area for discharge of the bypass airflow D in this example is AR+AR'.

The controller 44 selectively actuates the first nozzle section 54a, as described above, to control the air pressure of the bypass airflow D within the bypass passage 30. For example, closing the first nozzle section 54a reduces the effective cross-sectional area, which restricts the bypass airflow D and produces a pressure build-up (i.e., an increase in air pressure) within the bypass passage 30. Opening the first nozzle section 54a increases the effective cross-sectional area, which permits more bypass airflow D and reduces the pressure build-up (i.e., a decrease in air pressure). Likewise, a relatively smaller effective cross-sectional area results in less thrust due to the discharge of the bypass airflow D and a relatively larger effective cross-sectional area results in more thrust from the discharge of the bypass airflow D. In one example, the controller opens the first nozzle section 54a during take-off for additional thrust. Given this description, one of ordinary skill in the art will be able to recognize other types of nozzles for influencing the bypass airflow D.

Figure 5:
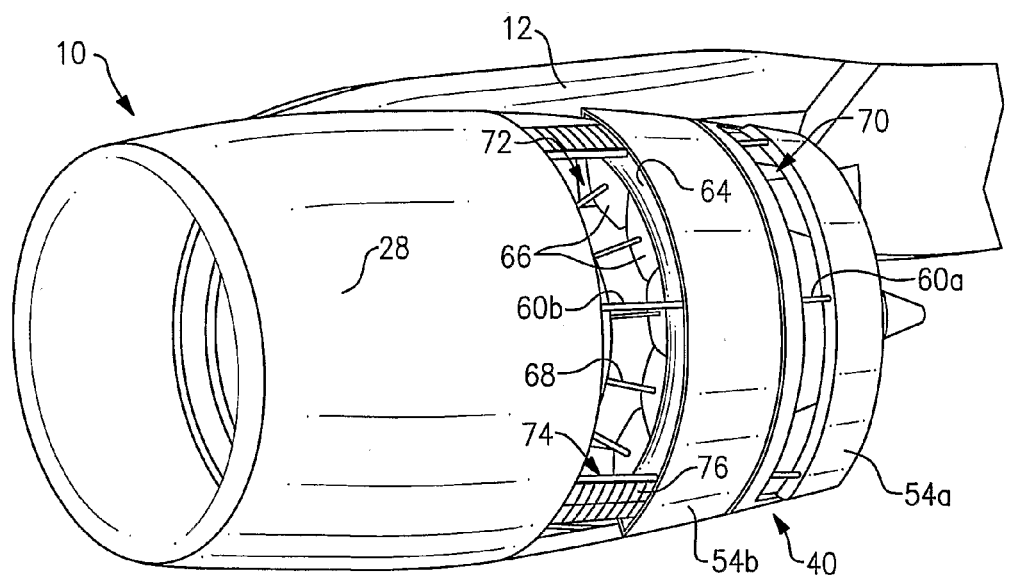
FIG. 5 illustrates a perspective view of the nozzle in the thrust reverse position.

Referring to FIGS. 4 and 5, the actuators 42 move the second telescoping section 60b axially aft in response to a command from the controller 44 to move the second nozzle section 54b from the stowed position to the thrust reverse position. In the thrust reverse position, the second nozzle section 54b is spaced apart from the nacelle 28 to provide an opening 72 there between. In one example, the second telescoping section 60b is moved in a known manner using hydraulic or pneumatic power.

Movement of the second nozzle section 54b causes the drag links 68 to pivot the blocker doors 66 into the bypass passage 30. The blocker doors 66 block the bypass airflow D and deflect the bypass airflow D radially outwards and forward relative to the centerline axis A through the opening 72. The movement of the second nozzle section 54b to the thrust reverse position also exposes the curved surface 64. The curved surface 64 deflects the bypass airflow D in a forward direction Z to generate a reverse thrust force.

In the disclosed example, the first telescoping section 60a and the first nozzle section 54a move axially when the second telescoping section 60b and the second nozzle section 54b move to the thrust reverse position. Alternatively, the first telescoping section 60a and the first nozzle section 54a remain stationary relative to the second telescoping section 60b and the second nozzle section 54b such that the first nozzle section 54a closes (i.e., the first nozzle section seals against the second nozzle section 54b to eliminate the opening 70).

Optionally, the nozzle 40 includes one or more cascade sections 74 for diverting the bypass airflow D that is discharged for thrust reversal in a desired direction. In this example, the cascade section includes louvers 76, such as airfoil-shaped louvers, that divert the discharged bypass airflow D in directions away from the pylon 12 and away from the ground (the bottom of FIG. 5).

The disclosed example nozzle 40 thereby integrates the function of influencing the bypass airflow D with the thrust reversing function. The nozzle 40 utilizes a single set or system of actuators 42 to eliminate the need for separate actuators or sets of actuators for altering the bypass airflow D and deploying the thrust reverser. Using a single actuator or set of actuators 42 as in the disclosed examples eliminates at least some of the actuators that would otherwise be used, thereby reducing the weight of the gas turbine engine 10 and increasing the fuel efficiency.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine system comprising:
    a fan rotatable about an axis;
    a housing arranged about the fan;
    a gas turbine engine core having a compressor at least partially within the housing;
    a fan bypass passage downstream of the fan for conveying a bypass airflow between the housing and the gas turbine engine core;
    a nozzle having a first nozzle section operative to move in a generally axial direction relative to the axis between a plurality of positions that influence the bypass airflow, and a second nozzle section adjacent the first nozzle section that is operative to also move in a generally axial direction between a stowed position and a thrust reverse position that diverts the bypass airflow in a thrust reversing direction; and
    an actuator including a telescoping member having a first telescoping section coupled with the first nozzle section such that the first nozzle section is moveable in unison with the first telescoping section and a second telescoping section coupled with the second nozzle section such that the second nozzle section is moveable in unison with the second telescoping section, wherein the first telescoping section is telescopically received within the second telescoping section, and wherein the first telescoping section and the second telescoping section are moveable independently of each other to selectively independently move the first nozzle section and the second nozzle section.

2. The gas turbine engine system as recited in claim 1, wherein the second nozzle section includes at least one blocker door that is pivotable between the stowed position and the thrust reverse position, where the at least one blocker door pivots into the bypass passage in the thrust reverse position.

3. The gas turbine engine system as recited in claim 1, wherein the second nozzle section includes a curved leading end section for diverting the bypass airflow in the thrust reversing direction.

4. The gas turbine engine system as recited in claim 1, further comprising at least one cascade section between the second nozzle section and the housing, the cascade section having louvers for diverting the bypass airflow.

5. The gas turbine engine system as recited in claim 1, wherein the first telescoping section is concentric with the second telescoping section.

6. The gas turbine engine system as recited in claim 1, wherein the plurality of positions includes a closed position wherein the first nozzle section is sealed against the second nozzle section and an open position wherein the first nozzle section is spaced apart from the second nozzle section.

7. The gas turbine engine system as recited in claim 1, wherein the second nozzle section is sealed against the housing when the second nozzle section is in the stowed position and the second nozzle section is spaced apart from the housing when the second nozzle section is in the thrust reverse position.

8. The gas turbine engine system as recited in claim 1, further comprising a controller operative to command the actuator to move the first nozzle section between the plurality of positions in response to an aircraft take-off condition and to command the actuator to move the second nozzle section to the thrust reverse position in response to an aircraft landing condition.

9. A nozzle for use in a gas turbine engine, comprising:
    a first nozzle section operative to move in a generally axial direction relative to an engine centerline between a plurality of positions that influence a bypass airflow through a fan bypass passage;
    a second nozzle section adjacent the first nozzle section that is operative to also move in a generally axial direction relative to an engine centerline between a stowed position and a thrust reverse position that diverts the bypass airflow in a thrust reversing direction; and
    an actuator including a telescoping member having a first telescoping section coupled with the first nozzle section such that the first nozzle section is moveable in unison with the first telescoping section and a second telescoping section coupled with the second nozzle section such that the second nozzle section is moveable in unison with the second telescoping section, wherein the first telescoping section is telescopically received within the second telescoping section, and wherein the first telescoping section and the second telescoping section are moveable independently of each other to selectively independently move the first nozzle section and the second nozzle section.

10. A method of controlling a gas turbine engine system including a nozzle having a first nozzle section that is moveable to control a bypass airflow within a bypass passage and a second nozzle section having a stowed position and a thrust reverse position for slowing a vehicle and, the method comprising:

(a) selectively independently moving the first nozzle section in an axial direction between an open position and a closed position using a first telescoping section of an actuator that is coupled with the first nozzle section such that the first nozzle section moves in unison with the first telescoping section to vary an effective cross-sectional area of the nozzle to control the bypass airflow; and (b) selectively independently moving the second nozzle section in the axial direction between the stowed position and the thrust reverse position using a second telescoping section of the actuator that is coupled with the second nozzle section such that the second nozzle section moves in unison with the second telescoping section to reverse a direction of the bypass flow and produce a thrust reversal force, wherein the first telescoping section is telescopically received within the second telescoping section.

11. The method as recited in claim 10, wherein said step (b) includes pivoting at least one blocker door of the second nozzle section from the stowed position to the thrust reverse position, where the at least one blocker door pivots into the bypass passage in the thrust reverse position.

12. The method as recited in claim 10, wherein said step (b) includes diverting the bypass airflow in a thrust reversing direction using a curved leading end section of the second nozzle section.

13. The method as recited in claim 10, including moving the first telescoping section relative to the second telescoping section that is concentric with the first telescoping section to move the first nozzle section.

14. The method as recited in claim 10, wherein said step (a) includes moving the first nozzle section from the closed position wherein the first nozzle section is sealed against the second nozzle section to the open position wherein the first nozzle section is spaced apart from the second nozzle section to increase the effective cross-sectional area.

15. The method as recited in claim 14, wherein said step (a) includes increasing the effective cross-sectional area in response to an aircraft take-off condition.

16. The nozzle as recited in claim 9, wherein the first telescoping section is directly coupled to the first nozzle section and the second telescoping section is directly coupled to the second nozzle section.

17. The nozzle as recited in claim 9, wherein movement of the first nozzle section in an axial direction to an open position provides an opening between an axially trailing end of the second nozzle section and an axially leading end of the first nozzle section.

18. The nozzle as recited in claim 9, wherein movement of the first nozzle section in an axial direction to an open position provides an opening between an axially trailing end of the second nozzle section and an axially leading end of the first nozzle section, and movement of the second nozzle section in an axial direction to an open position provides another opening between a leading end of the second nozzle section and a nacelle.

* * * * *